(12) United States Patent
Dietsch et al.

(10) Patent No.: US 10,946,594 B1
(45) Date of Patent: Mar. 16, 2021

(54) REINFORCED POLYMER-INFUSED FIBER COMPOSITE REPAIR SYSTEM AND METHODS FOR REPAIRING COMPOSITE MATERIALS

(71) Applicant: Cornerstone Research Group, Inc., Miamisburg, OH (US)

(72) Inventors: Benjamin Dietsch, Dayton, OH (US); Patrick J. Hood, Bellbrook, OH (US)

(73) Assignee: Cornerstone Research Group, Inc., Miamisburg, OH (US)

(*) Notice: Subject to any disclaimer, the term of this patent is extended or adjusted under 35 U.S.C. 154(b) by 78 days.

(21) Appl. No.: 15/864,186

(22) Filed: Jan. 8, 2018

Related U.S. Application Data

(60) Provisional application No. 62/443,580, filed on Jan. 6, 2017.

(51) Int. Cl.
*B29C 70/44* (2006.01)
*B29C 70/54* (2006.01)

(52) U.S. Cl.
CPC .......... *B29C 70/443* (2013.01); *B29C 70/546* (2013.01); *B29K 2713/00* (2013.01); *B29K 2913/00* (2013.01)

(58) Field of Classification Search
None
See application file for complete search history.

(56) References Cited

U.S. PATENT DOCUMENTS

| | | | |
|---|---|---|---|
| 3,447,479 A * | 6/1969 | Rosenberg | A61M 3/00 417/271 |
| 4,167,430 A | 9/1979 | Arachi et al. | |

(Continued)

FOREIGN PATENT DOCUMENTS

| | | |
|---|---|---|
| EP | 662492 A1 | 7/1995 |
| GB | 2172542 A | 9/1986 |

(Continued)

OTHER PUBLICATIONS

Barnell et al., "Evaluation of No-Oven, No-Autoclave Composite Manufacturing", Society for the Advancement of Material and Process Engineering with permission, Open Conference Systems, Long Beach, California May 6-9, 2013, http://www.memberjournal.com/SAMPE/index.php?conference.

(Continued)

*Primary Examiner* — Jose I Hernandez-Kenney
(74) *Attorney, Agent, or Firm* — Dinsmore & Shohl LLP

(57) ABSTRACT

A method and associated system for repairing a reinforced polymer-infused fiber composite. The method includes providing a resin infusion device having resin components contained in a flexible, sealed container, positioning a dry fiber reinforcement onto a base layer repair location, providing at least one resin conduit connecting the resin container to a first end of the dry fiber reinforcement, providing at least one vacuum conduit connecting a vacuum source to a second end of the dry fiber reinforcement, covering and sealing the base layer repair location with a vacuum enclosure affixed to the base layer repair location, creating a vacuum environment at the base layer repair location via the vacuum conduit, infusing the dry fiber reinforcement with a reactive mixture of the resin components under vacuum conditions via the resin tubing to form a resin-infused fiber reinforcement, and curing the resin-infused fiber reinforcement inside the vacuum enclosure.

14 Claims, 4 Drawing Sheets

(56) References Cited

U.S. PATENT DOCUMENTS

| | | | |
|---|---|---|---|
| 4,936,939 | A | 6/1990 | Woolum et al. |
| 4,944,824 | A | 7/1990 | Gupta et al. |
| 5,569,508 | A | 10/1996 | Cundiff |
| RE37,920 | E | 12/2002 | Moffatt et al. |
| 6,752,190 | B1 | 6/2004 | Boll et al. |
| 7,192,634 | B2 | 3/2007 | Carter et al. |
| 8,163,209 | B2 | 4/2012 | Glazebrook |
| 8,308,889 | B2 | 11/2012 | Glancy et al. |
| 8,356,989 | B2 | 1/2013 | Waldrop et al. |
| 8,728,262 | B2 | 5/2014 | Miller et al. |
| 8,900,391 | B2 | 12/2014 | Silcock et al. |
| 9,908,993 | B1 | 3/2018 | Barnell et al. |
| 2002/0022422 | A1 | 2/2002 | Waldrop, III et al. |
| 2004/0223801 | A1* | 11/2004 | Detwiler .............. A61J 1/2093 401/132 |
| 2004/0247813 | A1* | 12/2004 | Hansen .............. B65D 81/3266 428/43 |
| 2005/0023712 | A1* | 2/2005 | Backhouse .......... B29C 70/546 264/40.4 |
| 2005/0238743 | A1* | 10/2005 | Wanstrath ............ B29C 73/025 425/12 |
| 2007/0080078 | A1* | 4/2007 | Hansen .............. B65D 81/3266 206/219 |
| 2008/0197526 | A1 | 8/2008 | Shafi et al. |
| 2009/0131556 | A1 | 5/2009 | Honda et al. |
| 2009/0189320 | A1 | 7/2009 | Bolick et al. |
| 2009/0252921 | A1 | 10/2009 | Bottler et al. |
| 2009/0269557 | A1 | 10/2009 | Stiesdal |
| 2010/0143145 | A1 | 6/2010 | Jones |
| 2010/0196654 | A1 | 8/2010 | Maheshwari |
| 2011/0077328 | A1 | 3/2011 | Valette et al. |
| 2011/0139344 | A1 | 6/2011 | Watson et al. |
| 2011/0254196 | A1 | 10/2011 | Vauchel et al. |
| 2012/0175824 | A1* | 7/2012 | Fergusson ............ B29C 70/548 264/571 |
| 2013/0096232 | A1 | 4/2013 | Theophanous et al. |
| 2013/0225788 | A1* | 8/2013 | Meegan ................ C08G 59/38 528/408 |
| 2014/0216634 | A1* | 8/2014 | Hanks .................. B29C 70/443 156/98 |
| 2014/0370237 | A1 | 12/2014 | Ponsolle et al. |
| 2015/0099834 | A1 | 4/2015 | Barnell et al. |

FOREIGN PATENT DOCUMENTS

| | | |
|---|---|---|
| GB | 2483730 A | 3/2012 |
| RU | 2488612 C1 | 7/2013 |
| WO | 200054949 A2 | 9/2000 |
| WO | 2006089696 A1 | 8/2006 |
| WO | 2013075716 A1 | 5/2013 |

OTHER PUBLICATIONS

Dierksen, "Optimization of High Temperature VARTM Process", Final Report, Nanotechnology and Material Systems REU, Summer of 2006, pp. 1-7.

Kado Corporation, "High Performance Composites", http://www.kado-corporation.com/html/en/technology.html, May 15, 2010.

Koutsos, V., Engineering properties of polymers; ICE Manual of Construction Materials; Jan. 2009; pp. 585-591; Institution of Civil Engineers.

International Search Report and Written Opinion dated Feb. 21, 2014 pertaining to International application No. PCT/US2013/065658.

Gardiner, "Resin-Infused MS-21 Wings and Wingbox", CompositesWorld, Jan. 1, 2014, http://www.compositesworld.com/articles/resin-infused-ms-21-wings-and-wingbox.

Dietsch et al, "No-oven, No-autoclave Composite Tool Fabrication", Society for the Advancement of Material and Process Engineering.

Miller et al., "Study of Out-time on the Processing and Properties of IM7/977-3 Composites", ntrs.nasa.gov/archive/nasa/casi.ntrs.nasa.gov/20110016052.pdf.

Fabrication Methods, CompositesWorld, Jan. 1, 2014, http://www.compositesworld.com/articles/fabrication-methods.

"Fabrication Methods (2015)", CompositesWorld, Jan. 9, 2015, http://www.compositesworld.com/articles/fabrication-methods-2015.

Girardy et al., "An Innovative Composite Solution for Cost-effective Primary Aircraft Structures", JEC Composites Magazine, No. 80 Apr.-May 2013, pp. 36-38.

Kaps et al., "Hybrid Fabrication Route—Cost Efficient CFRP Primary Airframe Structures", 25th International Congress of the Aeronautical Sciences, 2006, pp. 1-11.

Fratta et al., "Approach to Optimize Combined Out-of-autoclave Prepreg/LCM Process for Integrated Structures" (Abstract Only), 2012 SAMPE International Symposium and Exhibition—Emerging Opportunities: Materials and Process Solutions.

Machine translation of RU 2488612 C1, provided by Espacenet (no date).

Partial Translation of RU 2488612 C1, provided by USPTO translations branch (no date).

Technical Data Sheet for Stretchlon 700, provided by Airtech International, Inc (2013).

Technical Data Sheet for DER 330, provided by Dow (no date).

Non-Final Office Action dated Mar. 26, 2018 pertaining to U.S. Appl. No. 15/874,458.

Machine translation of WO 2006/089696 A1 (no date).

* cited by examiner

REINFORCED POLYMER-INFUSED FIBER COMPOSITE REPAIR SYSTEM AND METHODS FOR REPAIRING COMPOSITE MATERIALS

CROSS-REFERENCE TO RELATED APPLICATIONS

This application claims the benefit of U.S. Provisional Application No. 62/443,580, filed Jan. 6, 2017.

TECHNICAL FIELD

Embodiments of the present disclosure are generally related to systems and methods of making reinforced polymer-infused fiber composites, and are specifically related to systems and methods of making fiber-reinforced epoxy composites utilizing easily portable and storable materials.

SUMMARY

Polymer-infused fiber composites are commonly used to repair a wide variety of structures. One repair method often employed to repair variPolymer-infused fiber composites are commonly used to repair a wide variety of structures. One repair method often employed to repair various aerospace structures includes using polymer composites to create a pre-cured composite patch that is the size of the area to be repaired. The composite patch is then bonded to the structure to be repaired using film adhesive and a temperature-controlled vacuum blanket to accelerate the curing process. A further aerospace composite repair method involves applying wet resin to dry pre-cut composite layers and then placing the wet composite layers onto the repair area in a technique known as wet layup. A vacuum bag and a heater are next applied to the repair area to consolidate and cure the composite repair.

Similar methods are utilized in both the marine and wind-turbine industries as well. For example, one common repair method in these industries involves manually applying mixed resin onto dry pre-cut composite fabric pieces. Once the mixed resin has been applied onto the pre-cut composite fabric pieces, the fabric pieces are placed directly onto the repair area. Finally, the resin is cured onto the structure at ambient temperatures.

However, these current methods generally require the user to assemble various tooling materials and to measure, pour and mix liquid resins in open containers before the repair operations. Such practices are time consuming, and mixing of resin in an open container is typically both messy and toxic to the user and the environment. These methods become problematic when working in indoor spaces as the liquid resins, if spilled, create nearly irremovable stains and may also create health hazards if inhaled by the user. In general, such operations require significant cleanup efforts of the excess resin chemicals after the repair operations are completed. Thus, it is desirable to have a composite repair system that is pre-packaged and ready to use to reduce the time for repair operations and exposure of the technician to chemicals. Furthermore, these current methods often require patch curing prior to secondary bonding, take extended periods of time to cure, and often require additional cumbersome tools that are not readily available to users without retrieving them from another location. For example, methods that demand heat in order to cure the composite involve heating blankets, other heating means, or additional vacuum sources that all require the use of electricity. Users facing unexpected damage in remote locations, for example, will not necessarily have these heating means readily available to them. Thus it is also desirable to have a composite repair system that is portable and can be carried to and used in remote locations with or without a power source.

As a result, current composite repair methods have been ineffective at providing methods that allow a user to quickly repair damage without requiring the use of open liquid resins or secondary tooling. Further, current composite repair methods have been ineffective at providing the advantage of portability that each component required is easily transportable by the user to the repair location and may be kept on-hand for unexpected repairs.

Accordingly, embodiments of the present disclosure are directed to reinforced polymer-infused fiber composite repair systems that utilize a handheld vacuum source, a resin infusion device comprising a sealed, flexible container containing curable resins in one or more sealed compartment having at least one burst seal that is breakable by applying pressure, and various other composite materials. The present embodiments reduce the environmental and personal health risk by eliminating the needs to mix resin in open containers. The present embodiments also remove portability restrictions seen in current composite repair kits that require additional unwieldy equipment, other tools, or the use of electricity to complete a composite repair. Due to the portable nature of these reinforced polymer-infused fiber composite repair system embodiments, the repair kits can be easily transported in standard vehicles. This portability feature further allows for emergency or unplanned repairs when it is not feasible to either bring in current composite repair systems or transport the materials to be repaired at a different location. For example, embodiments of the portable composite repair system could be transported in a soldier's rucksack to a remote location for a repair in an area inaccessible by road or that requires an inconspicuous repair procedure. Further industrial applications may include repairs associated with Heavy Lift Launch Vehicles, military and commercial aircraft, wind blades and towers, civil and automotive infrastructure, and marine vessels.

In accordance with another embodiment of the present disclosure, a method for repairing a reinforced polymer-infused fiber composite is provided. The method includes positioning a dry fiber reinforcement onto a base layer repair location, providing a resin infusion device having a sealed, flexible container containing curable resin components in one or more sealed compartment having at least one seal that is breakable or burstable by applying pressure, providing at least one resin conduit connecting the resin containers to a first end of the dry fiber reinforcement, providing at least one vacuum conduit connecting a vacuum source to a second end of the dry fiber reinforcement, covering and sealing the base layer repair location with a vacuum enclosure affixed to the base layer repair location, creating a vacuum environment at the base layer repair location by connecting the vacuum enclosure to a vacuum source via the vacuum conduit, infusing the dry fiber reinforcement with a reactive mixture of the resin components under vacuum conditions via the resin tubing to form a resin-infused fiber reinforcement, and curing the resin-infused fiber reinforcement inside the vacuum enclosure.

BRIEF DESCRIPTION OF THE DRAWINGS

The following detailed description of the preferred embodiments of the present disclosure can best be understood when read in conjunction with the following drawings.

DETAILED DESCRIPTION

Embodiments of the present disclosure are directed to highly portable and readily operable systems and methods for repairing fiber-reinforced epoxy composites without the needs for messy mixing of resin in open containers and external, separate electrical heating elements, or large vacuum compressors.

Figure 1:
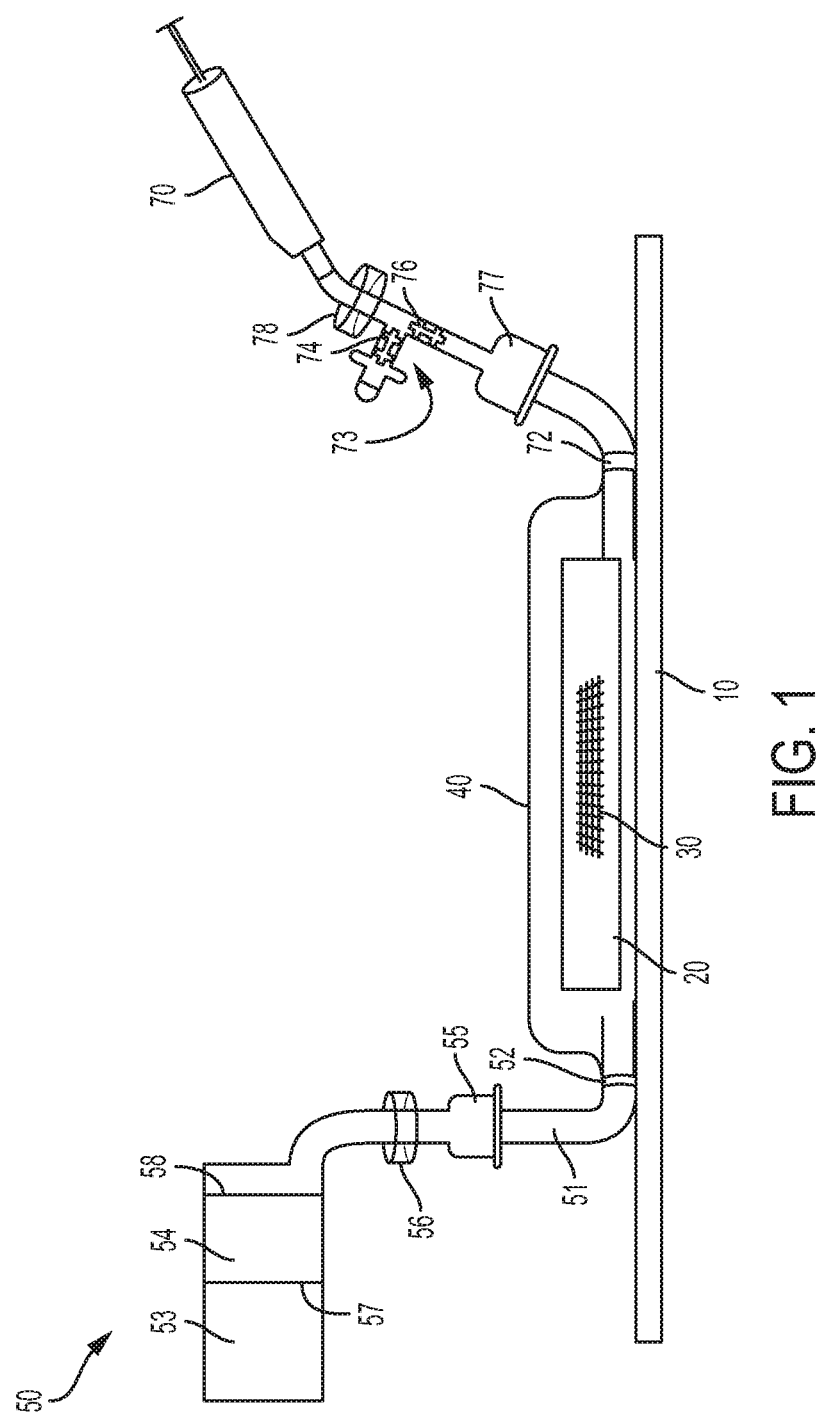
FIG. 1 is a schematic view depicting the multiple layers and components utilized in the present infusion process according to one or more embodiments of the present disclosure.
Figure 2:
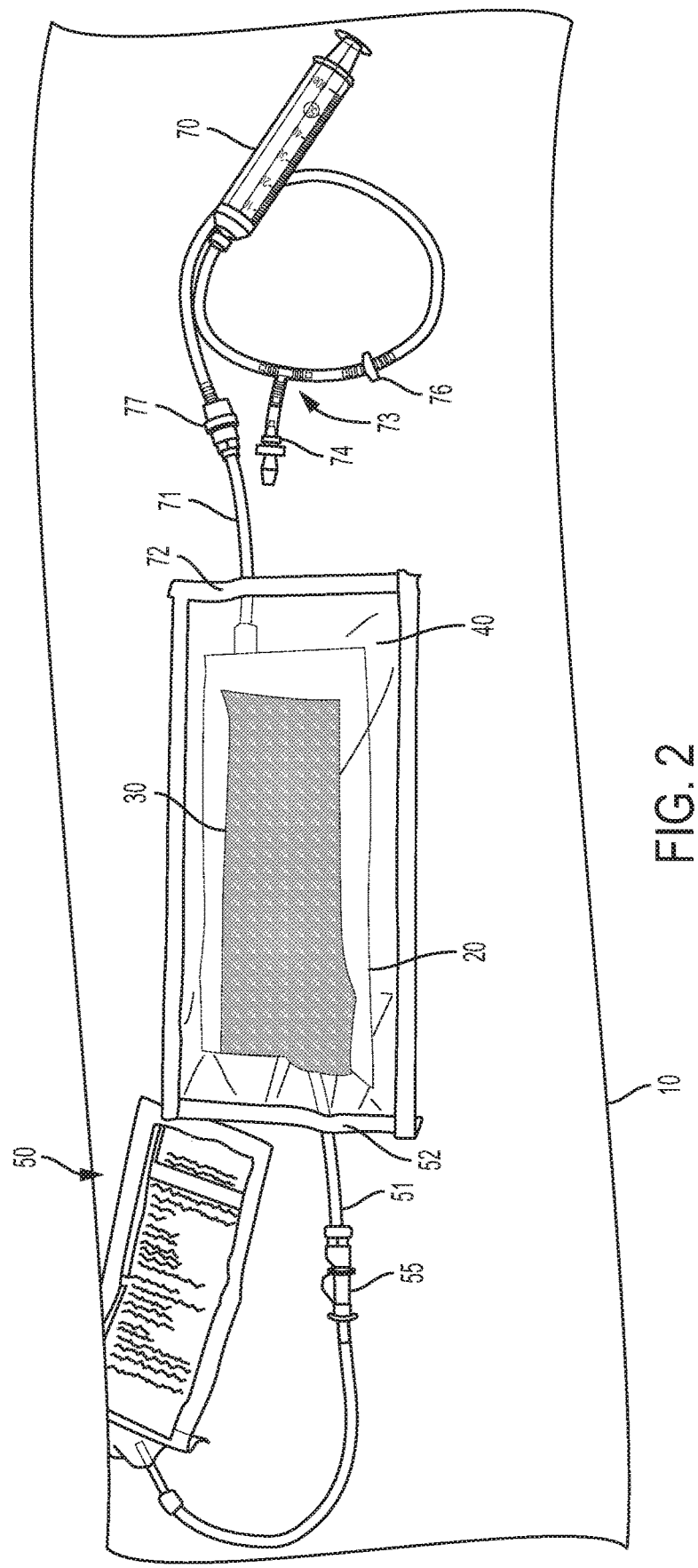
FIG. 2 is a further schematic view depicting the multiple layers and components utilized in the present infusion process according to one or more embodiments of the present disclosure.
Figure 3:
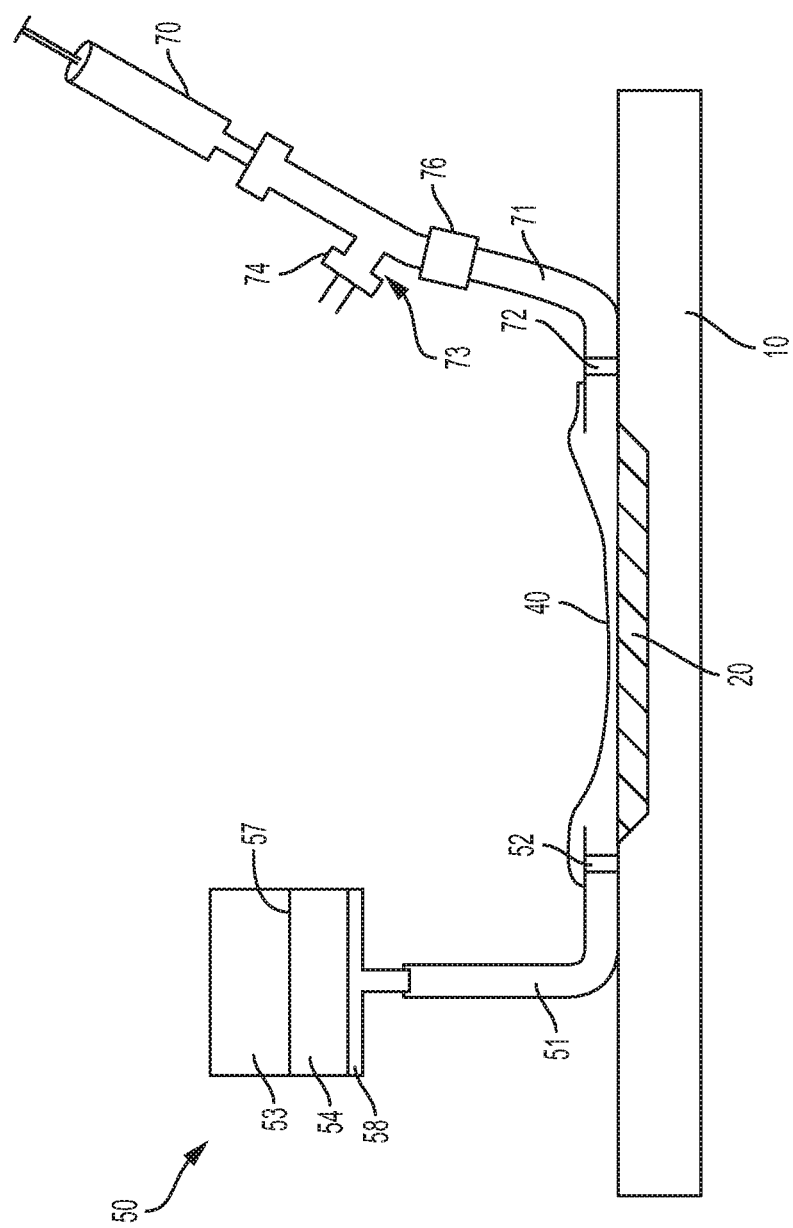
FIG. 3 is a further schematic view depicting the multiple layers and components utilized in the present infusion process according to one or more embodiments of the present disclosure.

Referring to FIGS. 1-3, the reinforced polymer-infused fiber composites and methods of making fiber-reinforced epoxy composites with easily portable and storable materials allows for repair of a base layer repair location 10 defining a damaged area of fiber reinforced composite in need of repair. In some embodiments, the base layer repair location 10 may be comprised of carbon fiber, fiberglass, honeycomb, foam core, or combinations thereof. The reinforced polymer-infused fiber composites may be used to treat surface damage, puncture damage, damage to the structural core, or combinations thereof.

Embodiments of the method for repairing a reinforced polymer-infused fiber composite utilize a reinforced polymer-infused fiber composite repair system comprising a resin infusion device. The resin infusion device comprises a flexible, sealed resin container 50, a vacuum enclosure 40, various resin and vacuum conduits and tubing, and a vacuum source 70.

In one or more embodiments, the system includes a vacuum enclosure 40; a dry fiber reinforcement 20 positioned in the vacuum enclosure 40 at a base layer repair location 10; a vacuum source 70 configured to create a vacuum environment under the vacuum enclosure 40 and capable of being handheld, hand-operated, hand-powered, or manually powered; a flexible, sealed resin container 50 comprising one or more containers containing curable resin components 53, 54 configured to infuse a damaged section at the base layer repair location 10; at least one resin conduit comprising resin tubing 51; and at least one vacuum conduit comprising vacuum tubing 71. The vacuum source 70 is connected to the vacuum enclosure 40 at a first end of the dry fiber reinforcement 20 via the vacuum conduit. Similarly, the flexible, sealed resin container 50 is connected via the resin conduit to a second end of the dry fiber reinforcement 20 opposite the first end of the dry fiber reinforcement 20.

Initially, the base layer repair location 10 is prepared for repair. Preparation of the base layer repair location 10 may include scarfing the damaged composite layer. As one skilled in the art would understand, scarfing is preparation of the damaged area by rounding off the corners of the damaged site and tapering the edges of the damaged site to provide for improved load transfer when the repair is completed. Further, additional repair preparation of the base layer repair location 10 may include repair of damaged core material such as replacement of a damaged core honeycomb structure. Removal of any surface contaminants from the base layer repair location 10 may also be completed such as by wiping the base layer repair location 10 with solvent or other cleaning agent.

Once the base layer repair location 10 is prepared for repair, a dry fiber reinforcement 20 is applied over the damaged base layer repair location 10. As used herein, the "fiber reinforcement" means one fiber layer or multiple stacked fiber layers used as the substrate material for the epoxy resin infusion. The fiber reinforcement layer or layers may have various structures. For example and not by way of limitation, the fiber layer may include random mats, scrims, chopped fibers, knits, unidirectional plies, three-dimensional weaves (3D weaves), three-dimensional fiber preforms (3D fiber preforms), and fabrics, such as plain weave, twill, or harness satin. It is further contemplated to use combinations of the above structures. Depending on the industrial application and the part thickness desired, it may be desirable to use one layer or multiple layers for the dry fiber reinforcement 20. While the majority of the contemplated embodiments utilize up to 20 layers, the present process is suitable for greater than 20 fiber layers as well. In specific embodiments, the fiber reinforcement may include from 1 to 20 fiber layers, or from 1 to 10 fiber layers, or from 5 to 10 fiber layers.

The dry fiber reinforcement 20 may comprise various compositions. For example, the dry fiber reinforcement 20 may comprise one or more components such as carbon fiber, glass fiber, aramid fiber, boron fiber, basalt fiber, polymer fiber, or combinations thereof. In a specific embodiment, the dry fiber reinforcement 20 may comprise one or more carbon fiber layers. While various commercial carbon fiber layers are considered suitable, one such suitable commercial carbon fiber layer is the Toray T-300 carbon fiber having a 2/2 twill fabric weaving construction.

In one or more embodiments, the present method may utilize the step of adding at least one mesh flow media 30 over the dry fiber reinforcement 20 to facilitate distribution and flow of the mixed resin components through the thickness and across the length and width of the dry fiber reinforcement 20. As would be familiar to one of ordinary skill in the art, flow media layer options are vast in design, material, and dimension.

In specific embodiments, the flow media layers may be layers comprised of woven material such as Style 6781 S2-Glass fabric from Fibre Glast. In further embodiments, the flow media layers may be comprised of non-woven materials. Examples of non-woven materials that can be used as flow media layers include knit material such as Breatherflow 60 from Airtech Advanced Materials Group, pressed directional materials such as Resinflow 60 from Airtech Advanced Materials Group, random mats such as Continuous Strand Mat from Fibre Glast, as well as other mesh or scrim material, or combinations thereof. Another commercially suitable flow media layer is GREENFLOW 75 produced by Airtech Advanced Materials Group. Various compositions are contemplated for use in the woven or non-woven structures. For example, the flow media may comprise nylon, polypropylene, propylene ethylene copolymer, aluminum screen material or combinations thereof. In a further optional embodiment, it is contemplated to use a peel-ply or resin permeable release layer between the fiber reinforcement and the flow media. In some embodiments, this peel-ply layer allows the flow media to be easily removed after curing the base layer repair location 10.

In one or more embodiments, the system includes a resin infusion device, which comprises the flexible, sealed resin container 50, various vacuum conduits, the vacuum enclosure 40, and the vacuum source 70. In these embodiments, at least one vacuum conduit and at least one resin conduit are applied and affixed over the edge of the dry fiber reinforcement 20. The vacuum conduit connects the vacuum source 70 and the vacuum enclosure 40 to allow the air to be removed from the vacuum enclosure 40 and a vacuum drawn. The resin conduit connects the flexible, sealed resin container 50 and the vacuum enclosure 40 to allow curable resin components 53, 54 to be drawn into the vacuum enclosure 40. In embodiments that incorporate the mesh flow media 30, the vacuum conduits and resin conduits may be applied and affixed over the mesh flow media 30.

With reference to FIGS. 1-3, "vacuum conduits" as used herein include the vacuum tubing 71 and optionally one or more additional components for connecting the vacuum source 70 and the vacuum enclosure 40. The additional components may include a system of valves 73, a vacuum tubing connector 77, and a vacuum flow regulator 78. The vacuum conduit is positioned to terminate proximal to the periphery of the base layer repair location 10 under the vacuum enclosure 40, over the edge of the dry fiber reinforcement 20, or both, wherein the vacuum tubing 71 is connected to the vacuum source 70 and is utilized to achieve a vacuum underneath the vacuum enclosure 40. The vacuum tubing 71 may be held in place by a vacuum tubing retainer 72 that affixes the vacuum tubing 71 to both the vacuum enclosure 40 and the base layer repair location 10.

Once again, with reference to FIGS. 1-3, "resin conduits" as used herein include the resin tubing 51 and optionally one or more additional components for connecting the flexible, sealed resin container 50 and the vacuum enclosure 40. The additional components may include a resin tubing connector 55 and a resin flow regulator 56. The resin conduit is positioned to terminate on the periphery of the base layer repair location 10 under the vacuum enclosure 40 or the dry fiber reinforcement 20, over the edge of the surface of the dry fiber reinforcement 20, or both. The resin flow regulator 56 may comprise at least one tubing clip with an adjustable screw down clip to regulate resin flow rate such as Mohr & Hoffman Tubing Clips.

In one or more embodiments, the resin tubing 51 is integral with the flexible, sealed resin container 50 and directly connected to the vacuum enclosure 40. In one or more embodiments, the flexible, sealed resin container 50 is connected by the resin tubing connector 55 to the resin tubing 51. The resin tubing 51 may be held in place at the vacuum enclosure 40 by a resin tubing retainer 52.

Figure 4:
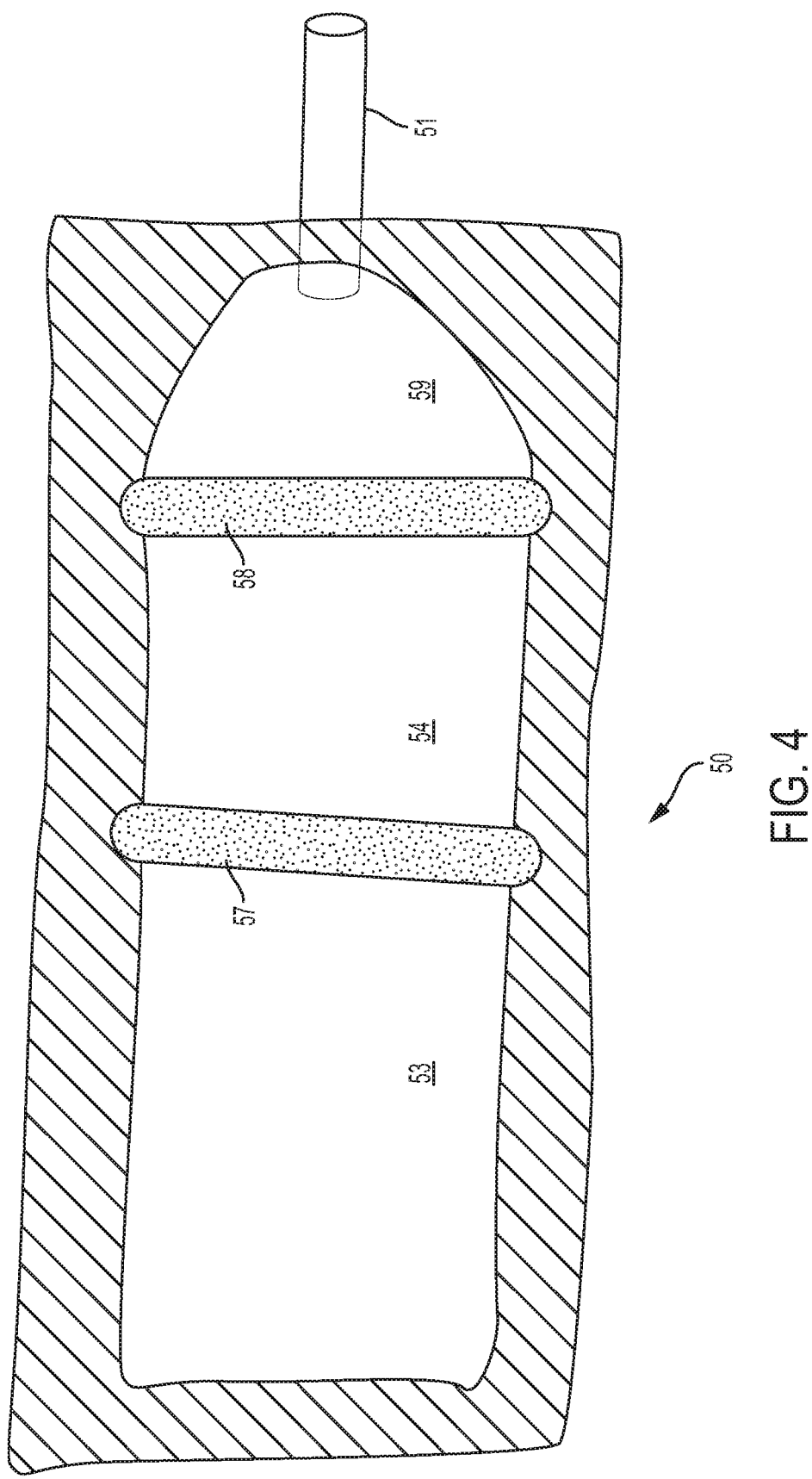
FIG. 4 is a schematic view of a flexible, sealed resin container according to one or more embodiments of the present disclosure.

With reference to FIG. 4, the flexible, sealed resin container 50 may comprise a first seal 58 that is breakable or burstable by applying pressure to the flexible, sealed resin container 50. The first seal 58 is a breakable or burstable separating seal which separates the curable resin components 53, 54 from a resin feed area 59 in fluid communication with the resin tubing 51. Upon a complete mixing of the curable resin components 53, 54, the first seal 58 may be broken in order to allow the flow of the mixed resin into the resin tubing 51 and subsequently across the dry fiber reinforcement 20.

Also with reference to FIG. 4, the flexible, sealed resin container 50 may comprise a second seal 57 separating the curable resin components 53, 54. In one embodiment, breaking the second seal 57, a breakable or burstable separating seal, allows the curable resin components 53, 54 to be mixed together in order to form a reactive curable resin mixture comprising the curable resin components 53, 54. In these embodiments, the second seal 57 separating the curable resin components 53, 54 may be broken by applying pressure to the flexible, sealed resin container 50 and the resin components 53, 54 may be mixed with a kneading motion over the surface of the flexible, sealed container 50.

Various materials are contemplated for the flexible, sealed resin container 50. In one or more embodiments, a bag comprised of plastic or a flexible metallic film may be utilized. In these embodiments, the periphery of the bag is sealed by a non-breakable seal. This non-breakable seal allows the first seal 58 and the second seal 57 to be broken or burst when pressure is applied to the flexible, sealed container 50, while maintaining its structural integrity so that the curable resin components 53, 54 are not exposed to external conditions. The first seal 58 and the second seal 57 may be broken or burst with pressure while the periphery of the flexible, sealed container 50 remains unbroken when pressure is applied.

In a further embodiment, the first seal 58, the second seal 57, or both the first seal 58 and the second seal 57 of the flexible, sealed container 50 is a removable mechanical seal. The removable mechanical seal may comprise a rod and sleeve mechanism to compress a local region of a plastic bag. An example of the removable mechanical seal is a removable sealing rod. One such suitable removable sealing rod is the Gripstic™ produced by First 2 Market Products, LLC.

Referring again to FIGS. 1-3, the resin conduit may deliver the mixed resin components 53, 54 across the thickness, length, and width of the dry fiber reinforcement 20. The spread of the mixed resin components 53, 54 across the fiber reinforcement may be assisted by the mesh flow media 30. In further embodiments, it is contemplated to use multiple resin conduits for production of a large composite part so as to shorten the time required for resin infusion across the dry fiber reinforcement 20.

Various materials are contemplated for the vacuum conduits and resin conduits. In one or more embodiments, flexible tubing such as a silicone tube with rigid spiral plastic wrap inside may be utilized. The resin conduit may be comprised of any material suitable for exposure to the mixed resin components 53, 54.

Referring again to FIGS. 1-3, the resin tubing 51 and the vacuum tubing 71 may be provided separately from the flexible, sealed resin container 50 and vacuum source 70 respectively. After affixing the resin tubing 51 proximal the base layer repair location 10, the flexible, sealed resin container 50 and other components of the resin conduit may be attached to the resin tubing 51 via the resin tubing connector 55. Similarly, after affixing the vacuum tubing 71 proximal to the base layer repair location 10 at a position substantially opposite that of the resin tubing 51, the vacuum source 70 and other components of the vacuum conduit may be attached to the vacuum tubing 71 via the vacuum tubing connector 77. In various embodiments, one or both of the resin tubing connector 55 and the vacuum tubing connector 77 may be a quick-connect junction, a threaded junction, or a flanged junction. One or both of the resin tubing connector 55 and the vacuum tubing connector 77 may also include a self-sealing valve to terminate flow upon disconnection.

In some embodiments, the base layer repair location 10 and the dry fiber reinforcement 20, and if present, the mesh flow media 30, are then covered in the vacuum enclosure 40. The vacuum enclosure 40 may encompass various components suitable for achieving a sealed environment, for example, a container or polymer vacuum bagging film may be used to achieve a sealed environment. The vacuum enclosure 40 is generally affixed to the periphery of the base layer repair location 10 via adhesive, peelable adhesive film, adhesive tape, putty, or combinations thereof. In one or more embodiments, the vacuum conduit may be secured in the vacuum enclosure 40 with the vacuum tubing retainer 72, which may comprise an adhesive, peelable adhesive film, adhesive tape, putty, or combinations thereof. Similarly, the resin conduit may be secured in the vacuum enclosure 40 with the resin tubing retainer 52, which may comprise an adhesive, peelable adhesive film, adhesive tape, putty, or combinations thereof.

In an embodiment, the vacuum source 70 is a handheld syringe capable of being used without the need for electricity in order to create a vacuum in the vacuum enclosure 40. In these embodiments, negative pressure is generated by drawing air out from the vacuum enclosure 40 by repeatedly pumping the handheld syringe. The air is removed by the handheld syringe from the vacuum enclosure 40 and is exhausted through a system of valves 73. The system of valves 73 releases air that is removed from under the vacuum enclosure 40 to the external environment. In other embodiments, an air-powered or steam-powered aspirator, a water aspirator, a hand-operated vacuum pump, or an electrically powered vacuum pump may be used as the vacuum source 70. It will be appreciated that the system of valves 73 may be utilized in conjunction with alternative vacuum sources 70 beyond a handheld syringe.

The system of valves 73 comprises a bleed valve 74 and a one-way valve 76 and allows the air to be removed from under the vacuum enclosure 40 when the handle of the plunger of the handheld syringe is decompressed or pulled to generate a negative pressure at the vacuum source 70. The air from under the vacuum enclosure 40 is then exhausted to the external environment by the bleed valve 74 when the plunger of the handheld syringe is compressed or pushed to generate a positive pressure at the vacuum source 70. Specifically, the system of valves 73 only allows for air to be removed from under the vacuum enclosure 40 during decompression of the vacuum source 70 as the bleed valve 74 is configured to only allow outward flow. Further, the one-way valve 76 is configured to prevent reintroduction of removed air into the vacuum enclosure 40 during compression of the vacuum source 70. In further embodiments, the vacuum flow regulator 78 may be placed onto or within the vacuum tubing 71 in order to adjust air flowing through the vacuum tubing 71. In these embodiments, the vacuum flow regulator 78 may be positioned at any point along the vacuum tubing 71 or associated components.

The pumping process is repeated until all air is removed from under the vacuum enclosure 40 and a vacuum is subsequently created under the vacuum enclosure 40. Creating a vacuum on the vacuum enclosure 40 produces a pressure gradient. For example and not be way of limitation, the pressure gradient may be from about 375 torr to about 760 torr. This pressure gradient enables the mixed resin components to infuse into the fiber reinforcement of the base layer repair location 10 by drawing the resin components from the resin tubing and across the base layer repair location 10. In further embodiments, the pressure gradient may be increased by rolling up the flexible, sealed resin container 50, or by placing a weight onto the flexible, sealed resin container 50 as the infusion process progresses.

After the pressure gradient has been created, the first seal 58 of the flexible, sealed resin container 50 is broken or burst to allow the resin to infuse into the fiber reinforcement, followed by subsequent curing to form the cured reinforced polymer-infused fiber composite. In some embodiments, the flexible, sealed resin container 50 is a prepackaged, breakable resin bag in which resin components 53, 54 with adequate mixing ratio of polymer resin and curing agent are stored separately within the bag. The resin components 53, 54 may be mixed by manually shaking or kneading the container until the resin components 53, 54 are fully mixed together. For ease of illustration, the resin is illustrated in FIGS. 1-4 as having two components, namely resin components 53, 54, but it is envisioned that any curable resin may be provided by the flexible, sealed resin container 50.

In various embodiments, the resin may comprise one part resin or two part resin. For a one-part resin, the sealed, flexible resin container 50 will have the first seal 58 near the outlet to the resin tubing. For a two-part resin, in addition to the first seal 58, there will be the second seal 57 that separates the two curable resin components 53, 54.

Upon combining the curable resin components 53, 54, the repair may then be infused by positioning the flexible, sealed resin container 50 so that the resin is released through the resin tubing 51 and flow into the vacuum enclosure 40. Specifically, the mixed resin is provided to the dry fiber reinforcement 20 and spread across the base layer repair location 10. In some embodiments, the resin flow regulator 56 may be used to adjust the amount and flow rate of resin flowing through the resin tubing 51 and ultimately ending up at the base layer repair location 10. In various embodiments, the resin flow regulator 56 may be positioned at any point along the resin tubing 51 or associated components.

In one or more embodiments, the vacuum source 70 may be further operated during the resin infusion process in order to remove more air from under the vacuum enclosure 40 and increase the pressure gradient to facilitate resin flow into and across the base layer repair location 10.

Additionally, it is contemplated that the utilization of an exothermic heat source or an external heat or radiation source could also be incorporated into further composite repair techniques depending on the curing needs of the resin utilized in the repair and the availability of power source. Without being bound by theory, utilizing a heat or radiation source in composite fabrication techniques advantageously achieves high performance composites, while minimizing the time needed for the resin to cure. In some embodiments, these external heat or radiation sources may be battery powered, solar powered, or powered by a manual hand crank so as to maintain its usefulness for remote composite repairs.

In some embodiments, the curable resin components 53, 54 may generate exothermic heat when mixed. In specific embodiments, the curable resin components 53, 54 have a high enthalpy of reaction when mixed as measured by differential scanning calorimetry (DSC), specifically, an enthalpy of reaction in the range of about 300 to about 1000 J/g, or about 500 to about 1000 J/g, or about 500 to about 800 J/g. In light of these higher enthalpies of reaction, there are higher exotherms produced by the reaction when the curable resin components 53, 54 are mixed. In addition, the curable resin components 53, 54, or the resulting mixed resin, may have a viscosity range of about 100 to about 1000 centipoise at 20 to 80° C.

Various compositions are contemplated for the curable resin components 53, 54. For example and not by way of limitation, the curable resin components 53, 54 may comprise at least one component selected from the group consisting of epoxy resin, vinyl ester, cyanate ester, bismaleimide, polyurethane resin, diisocyanate, rubber, polyimide, polyester resin, furan resin, or combinations thereof.

In one or more embodiments the curable resin components 53, 54 may comprise at least one component selected from the group consisting of diglycidyl ether of bisphenol A, diglycidyl ether of bisphenol F, resorcinol diglycidyl ether, N,N-Diglycidyl-4-glycidyloxyaniline, brominated diglycidyl ether of bisphenol A, novolac epoxy, tetraglycidyl meta-xylenediamine, 1,4-butanediol diglycidyl ether, 4,4'-Methylenebis(N,N-diglycidylaniline), tris(4-hydroxyphenyl)methane triglycidyl ether, tris(2,3-epoxypropyl)isocyanurate, or combinations thereof.

The curing agent, also called a hardener, may include various suitable components. In specific embodiments, these curing agents may comprise at least one curing agent selected from the group consisting of amines, diols, polyols, anhydride, catalysts such as peroxides, free radical initiators, or combinations thereof.

In one or more embodiments, the curing agent may comprise amine curing agents. These amine curing agents may comprise 4,4'-Methylene-bis(2-chloroaniline), 4,4'-diaminodiphenyl sulfone, isophorone diamine, Diethyltoluenediamine, Dimethylthiotoluenediamine, 4,4'-diaminodiphenylmethane, 1,3'-phenylenediamine, piperazine, Triethylenetetramine, 5-Amino-1,3,3-trimethylcyclohexanemethylamine, m-Xylylenediamine, bis(p-aminocyclohexylmethane), 2,4-Diaminotoluene, N,N,dimethylethylenediamine, or combinations thereof.

While the present disclosure primarily discusses epoxy infused carbon composites, the present process is also applicable to various other high performance resins. For example, and not by way of limitation, these high performance resins may include bismaleimide, cyanate ester, polyimide, or combinations thereof.

Optionally, in some embodiments, an external heating element (not shown) may be used in order to minimize the time needed to complete the resin infusion process. Without being bound by theory, the external heating element may include ovens, autoclaves, hot air heating sources, heat blankets, resistive heaters, or the like that are conventionally used during curing steps. This external heating element may be powered by portable electric batteries, car batteries, solar power, a hand crank, or the like that are conventionally used during curing steps. Upon completion of the curing process, the vacuum enclosure 40 and other repair materials are then removed from the base layer repair location 10 leaving the cured resin-infused fiber reinforcement therein as a repair patch of the damaged area of the base layer repair location 10.

What is claimed is:

1. A method for repairing a reinforced polymer-infused fiber composite comprising:
providing a resin infusion device comprising a flexible, sealed resin container containing one or more uncured resin components in one or more separate resin compartments; a vacuum enclosure; at least one resin conduit; at least one vacuum conduit; and a vacuum source, wherein the flexible, sealed resin container comprises a first seal separating the one or more resin compartments from the at least one resin conduit and a non-breakable seal of uniform strength extending around the entire periphery of the flexible, sealed resin container to seal the flexible, sealed resin container and secure the at least one resin conduit, the first seal being a breakable or burstable separating seal;
positioning a dry fiber reinforcement onto a base layer repair location;
connecting the least one resin conduit from the flexible, sealed resin container to a first end of the dry fiber reinforcement;
affixing the at least one resin conduit to the base layer repair location;
connecting the at least one vacuum conduit from the vacuum source to a second end of the dry fiber reinforcement, where the second end of the dry fiber reinforcement is opposite the first end of the dry fiber reinforcement and proximal the periphery of the base layer repair location such that the at least one vacuum conduit terminates over an edge of the dry fiber reinforcement under the vacuum enclosure;
affixing the at least one vacuum conduit to the base layer repair location;
covering and sealing the base layer repair location with the vacuum enclosure;
affixing the vacuum enclosure to the base layer repair location;
using the vacuum source to create a vacuum environment at the base layer repair location via the at least one vacuum conduit;
breaking or bursting the first seal to release a reactive mixture of the resin components into the resin tubing; and
infusing the dry fiber reinforcement with the reactive mixture of the resin components under vacuum conditions via the resin tubing to form a resin-infused fiber reinforcement, wherein the resin-infused fiber reinforcement is cured inside the vacuum enclosure.

2. The method of claim 1, wherein the resin components have a viscosity range of from about 100 to about 1000 centipoise at 20 to 80° C.

3. The method of claim 1, wherein the vacuum source is handheld, hand-operated, hand-powered, or manually powered.

4. The method of claim 3, wherein the vacuum source is a handheld syringe.

5. The method of claim 4, wherein the vacuum conduit comprises a system of valves disposed between the vacuum source and the vacuum enclosure configured to allow air to be drawn out of the vacuum enclosure by applying a negative pressure at the vacuum source and subsequently exhausted to the external environment by applying a positive pressure at the vacuum source.

6. The method of claim 1, wherein breaking or bursting the first seal releases the reactive mixture of the resin components into the resin tubing.

7. The method of claim 1, wherein the flexible, sealed resin container further comprises a second seal separating the one or more separate resin compartments, the second seal being a breakable, burstable, or removable separating seal.

8. The method of claim 7, wherein the method further comprises breaking, bursting, or removing the second seal and mixing the resin components to form the reactive mixture of the resin components prior to breaking or bursting the first seal to release the reactive mixture of the resin components into the resin tubing.

9. The method of claim 1, wherein the vacuum enclosure is a polymer vacuum bagging film.

10. The method of claim 1, wherein the dry fiber reinforcement comprises at least one component selected from the group consisting of polymer fiber, glass fiber, ceramic fiber, carbon fiber, or combinations thereof.

11. The method of claim 1, wherein the resin components comprise at least one component selected from the group consisting of epoxy resin, vinyl ester, cyanate ester, bismaleimide, polyurethane resin, diisocyanate, rubber, polyimide, polyester resin, furan resin, or combinations thereof.

12. A reinforced polymer-infused fiber composite repair system, the system comprising:
- a resin infusion device; and
- a dry fiber reinforcement positioned in a vacuum enclosure at a base layer repair location; wherein:
- the resin infusion device comprises
  - the vacuum enclosure,
  - a vacuum source configured to create a vacuum environment,
  - a flexible, sealed resin container containing one or more uncured resin components in one or more separate resin compartments,
  - at least one resin conduit comprising resin tubing, and
  - at least one vacuum conduit comprising vacuum tubing,
  - wherein the flexible, sealed resin container comprises a first seal separating the one or more resin compartments from the at least one resin conduit and a non-breakable seal of uniform strength extending around the entire periphery of the flexible, sealed resin container to seal the flexible, sealed resin container and secure the at least one resin conduit, the first seal being a breakable or burstable separating seal;
- the vacuum source is connected to the vacuum enclosure at a first end of the dry fiber reinforcement proximal the periphery of the base layer repair location via the at least one vacuum conduit such that the at least one vacuum conduit terminates over an edge of the dry fiber reinforcement under the vacuum enclosure; and
- the flexible, sealed resin container is connected to a second end of the dry fiber reinforcement opposite the first end of the dry fiber reinforcement via the resin conduit.

13. The reinforced polymer-infused fiber composite repair system of claim 12, wherein the flexible, sealed resin container comprises a second seal separating the one or more separate resin compartments, the second seal being a breakable, burstable, or removable separating seal.

14. The reinforced polymer-infused fiber composite repair system of claim 12, wherein the vacuum source is a handheld syringe.

\* \* \* \* \*